F. G. KOEHLER.
HAND TRUCK.
APPLICATION FILED OCT. 23, 1911.
1,033,421.
Patented July 23, 1912.
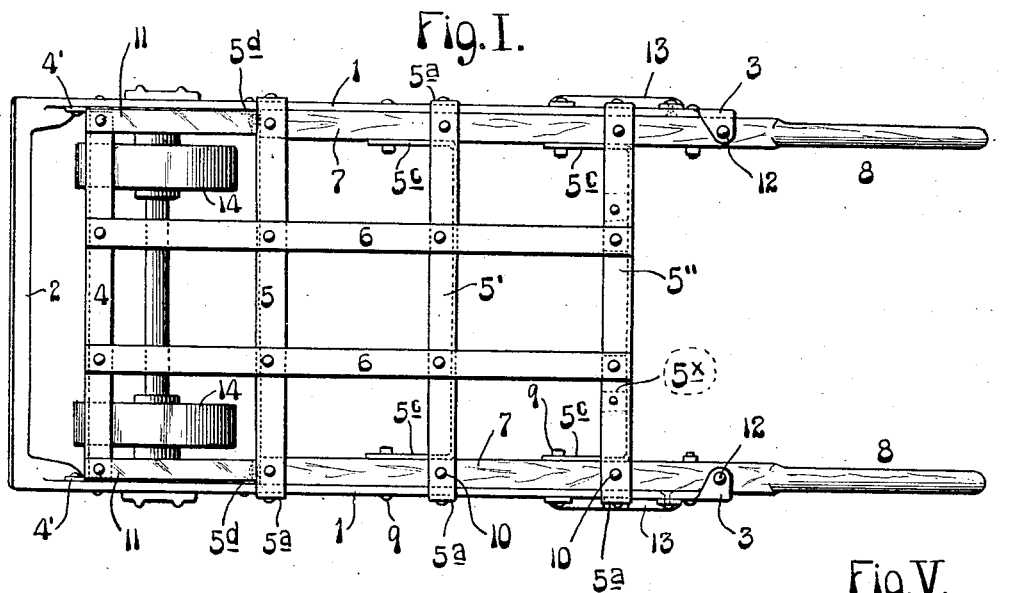
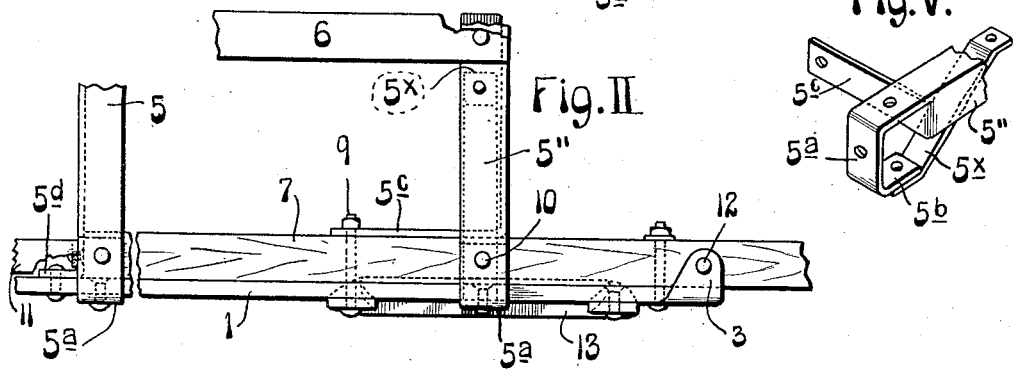
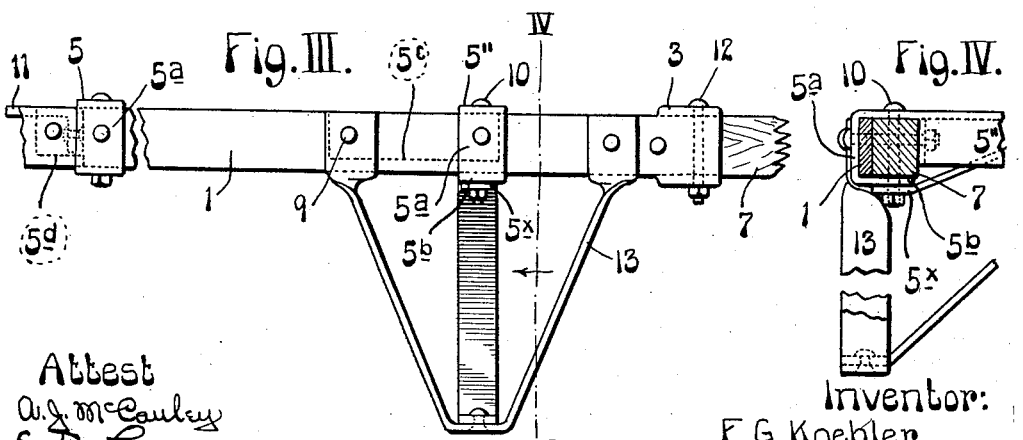
Attest
A. J. McCauley
E. B. Linn
Inventor:
F. G. Koehler
by Knight & Cook Attys
COLUMBIA PLANOGRAPH CO., WASHINGTON, D. C.

UNITED STATES PATENT OFFICE.

FRANK G. KOEHLER, OF ST. LOUIS, MISSOURI.

HAND-TRUCK.

1,033,421.  Specification of Letters Patent.  Patented July 23, 1912.

Application filed October 23, 1911. Serial No. 656,148.

*To all whom it may concern:*

Be it known that I, FRANK G. KOEHLER, a citizen of the United States of America, and resident of the city of St. Louis and State of Missouri, have invented certain new and useful Improvements in Hand-Trucks, of which the following is a full, clear, and exact description, reference being had to the accompanying drawings, forming part of this specification.

My invention relates to a hand truck comprising a metal frame and wooden handles secured to said frame.

The object of the present invention is the production of a stronger and more durable truck structure of this kind by so arranging the elements of the metal frame as to permit of the wooden handles extending throughout practically the entire length of the frame and so securing the handles and frame to each other as to obtain a maximum degree of strength and durability in the truck.

Figure I is a top or plan view of my hand truck. Fig. II is an enlarged top or plan view of fragments of the truck. Fig. III is an enlarged side elevation partly broken out of the truck frame. Fig. IV is a vertical cross section taken on line IV—IV, Fig. III. Fig. V is a perspective view of one end of one of the cross bars of the truck frame.

In the accompanying drawings: 1 designates the metal side bars of the frame of my truck having integral therewith at their forward ends the toe piece 2. At the rear end of each side bar is a U-shaped yoke or socket member 3 having horizontal arms that are spaced apart from each other to receive a handle entering into the truck structure, as will hereinafter more fully appear.

4 designates a forward cross bar, 5, 5′ intermediate cross bars, and 5″ a rear cross bar, all of which serve to unite the side bars 1 of my truck frame.

6 are longitudinal tie bars riveted or bolted to the cross bars which afford additional rigidity in the metal frame of the truck.

The forward cross bar 4 is of angle shape in cross section and comprises a horizontal top flange and a vertical flange extending downwardly from the forward edge of the horizontal flange. The vertical flange just referred to fits between the side bars 1, and it is provided at its ends with forwardly turned arms 4′ that are riveted to the side bars. The horizontal flange of the forward cross bar is provided with downturned legs that lie against the inside faces of and are secured to the side bars 1 by rivets.

The rearmost intermediate cross bar 5′ and rear cross bar 5″ are of angle shape in cross section, and each of said cross bars comprises a top horizontal flange and a rear vertical flange extending downwardly from the rear edges of the horizontal flanges. The vertical flanges are of less length than the distance between the side bars 1 and are provided with arms $5^c$ that extend forwardly beneath the horizontal top flanges of the cross bars and preferably to a considerable distance beyond the cross bars. The arms $5^c$ are parallel with the side bars 1 of the truck frame, and are sufficiently spaced therefrom to permit the location of the truck handles between them and the side bars when said handles are positioned in the truck, as will presently be fully explained. The top horizontal flanges of the cross bars 5′ and 5″ are of sufficient length to extend over the side bars 1, and they are provided with downturned legs $5^a$, suitably secured to the side bars and terminating in inturned arms $5^b$, which extend beneath the side bars and inwardly therefrom parallel with the horizontal top flanges.

$5^x$ are straps that connect the arms $5^b$ of the rear cross bar 5″ to the horizontal flanges of the said cross bars 5″.

The cross bar 5 is formed with a horizontal top flange and a vertical flange extending downwardly from the forward edge of said horizontal flange, the horizontal flange being extended over the side bars 1, then downwardly and inwardly beneath said side bars.

7 designates the handles of my truck, which are preferably of wood, and are provided at their rear ends with grips 8. These handles are of sufficient length to extend beneath the horizontal top flange of the forward intermediate cross bar 5 and against the vertical flange of said bar. The handles are of such dimensions in cross section as to fit between the vertical side bars 1 and the vertical arms $5^c$ of the cross bars 5′ and 5″, and also between the horizontal top flanges of said cross bars and the inturned arms $5^b$ beneath the last named. The handles also lie between the top flange of the cross bar 5 and a lower inturned arm of said cross bar similar to the arms 5ᵇ. The handles 7 are secured to the metal frame by horizontal bolts 9, which extend through the side bars 1 and the arms 5ᶜ of the cross bars 5', 5'', and also by vertical bolts 10 that extend through the horizontal top flanges, and lower inturned arms of the cross bars 5, 5' and 5''.

11 designates brace bars connecting the forward cross bar 4 and the next adjacent cross bar 5. These brace bars extend onto and are riveted to the horizontal top flanges of the cross bar 4, and are provided with downturned rear ends riveted to the vertical flange of the cross bar 5.

The portions of the handles located at the rear of the rear cross bar 5'' are positioned within the yokes 3 of the side bars to which they are secured by vertical bolts 12, thereby causing the rear ends of the side bars to partially take care of the strain imposed upon the handles for more security than such strain would be taken care of in the absence of the yokes 3.

It will be seen that inasmuch as the handles of my truck are secured in place solely by the bolts, 9, 10 and 12, which serve to connect them to the metal frame of the truck, either handle may be readily separated from the frame in the event of the handle being broken, and a new handle substituted for the one previously in use at a minimum of cost and without disturbing any part of the truck frame.

My truck is provided with suitable legs 13 secured to the side bars 1 and wheels 14 arranged in suitable bearing members, also secured to the side bars.

I claim:—

1. In a hand truck, the combination of a frame comprising side bars, cross bars of angle shape in cross section arranged transversely of said side bars, the said cross bars having horizontal top flanges and vertical flanges beneath said top flanges terminating at their ends in arms arranged parallel with and spaced apart from said side bars, handles located beneath the top flanges of said cross bars and between said side bars and the arms extending from the vertical flanges of the cross bars, and means for connecting said side bars, handles and arms.

2. In a hand truck, the combination of side bars, cross bars of angle shape in cross section extending transversely of said side bars, the said cross bars having vertical flanges terminating in arms arranged parallel with said side bars and spaced apart therefrom, the said cross bars also having horizontal top flanges extending over said side bars provided with legs secured to said side bars and which terminate in inturned arms arranged beneath the horizontal top flanges of the cross bars, handles located between said side bars and the arms of the vertical cross bar flanges and between the horizontal top flanges of the cross bars and the arms beneath them, and means for connecting said handles to said cross bars and side bars.

3. In a hand truck, the combination of frame side bars provided at their rear ends with yokes, cross bars connecting said side bars and having members arranged parallel with the side bars, handles located between said side bars and said members parallel therewith, means for securing said handles to said yokes, and means for securing said handles between said side bars and the cross bar members parallel therewith.

4. In a hand truck, the combination of a frame comprising side bars, angle cross bars arranged transversely of said side bars, the horizontal top flanges of said cross bars terminating in downturned legs secured to said side bars and inturned horizontal arms beneath and spaced from the cross bar top flanges, providing pockets within said members, straps connecting said arms to said cross bars, and handles located within and secured to said cross bars.

In testimony whereof, I have hereunto affixed my signature, this 19th day of October, 1911.

FRANK G. KOEHLER.

In the presence of—
E. B. LINN,
A. J. McCAULEY.

---

Copies of this patent may be obtained for five cents each, by addressing the "Commissioner of Patents, Washington, D. C."